(12) United States Patent
Brandes et al.

(10) Patent No.: US 6,927,342 B1
(45) Date of Patent: Aug. 9, 2005

(54) INSULATION FOR ELECTRICAL CONDUCTORS THAT PRODUCES NO PARTIAL DISCHARGES

(75) Inventors: Heinz Brandes, Lörrach (DE); Thomas Hillmer, Petersberg (DE); Jean-Luc Rediger, Saint-Louis (FR); François Jund, Hirsingue (FR); Franz Hänggi, Zullwil (CH); José Fernandez, Breitenbach (CH)

(73) Assignee: Von Roll Isola Winding Systems GmbH, Dobeln (DE)

( * ) Notice: Subject to any disclaimer, the term of this patent is extended or adjusted under 35 U.S.C. 154(b) by 0 days.

(21) Appl. No.: 10/311,855

(22) PCT Filed: Jun. 23, 2000

(86) PCT No.: PCT/CH00/00345

§ 371 (c)(1),
(2), (4) Date: Apr. 29, 2003

(87) PCT Pub. No.: WO01/99255

PCT Pub. Date: Dec. 27, 2001

(51) Int. Cl.$^7$ .............................. H01B 7/00; H01B 7/34
(52) U.S. Cl. ................. 174/110 R; 174/36; 174/120 R; 174/126.1; 174/127; 174/128.1
(58) Field of Search ...................... 174/110 R, 110 AR, 174/110 SR, 110 N, 110 D, 110 FC, 113 R, 117 R, 117 FF, 117 F, 117 A, 119 R, 119 C, 120 R, 120 C, 120 AR, 121 R, 121 AR, 122 R, 122 G, 124 R, 126.1, 126.4, 127, 128.1, 128.2, 129

(56) References Cited

U.S. PATENT DOCUMENTS

| | | | | |
|---|---|---|---|---|
| 3,629,024 A | * | 12/1971 | Kimura et al. | 156/56 |
| 3,749,950 A | * | 7/1973 | Lenz | 310/45 |
| 4,038,741 A | | 8/1977 | Schuler | |
| 4,160,926 A | * | 7/1979 | Cope et al. | 310/215 |
| 4,405,553 A | * | 9/1983 | Lovgren et al. | 264/272.19 |
| 4,734,976 A | * | 4/1988 | Matson | 29/606 |
| 5,606,148 A | * | 2/1997 | Escherich et al. | 174/88 R |
| 5,700,530 A | * | 12/1997 | Van Beersel | 428/35.9 |

FOREIGN PATENT DOCUMENTS

| | | | | |
|---|---|---|---|---|
| DE | 1 056 722 | | 9/1955 | |
| DE | 1156171 | | 2/1961 | |
| DE | 1 156 171 | | 10/1963 | |
| DE | 1 540 474 | * | 7/1965 | H01B/17/60 |
| DE | 32 12 060 A1 | * | 10/1983 | H01F/27/32 |
| DE | 198 03 308 | | 10/1998 | |
| EP | 088 261 | | 9/1983 | |
| EP | 00 88 261 | | 9/1983 | |
| EP | 00880261 A | * | 5/1986 | H02K/3/40 |
| EP | 0 822 640 | | 2/1998 | |
| FR | 2.230.110 | | 12/1974 | |
| JP | 52-90099 | * | 7/1977 | H01B/17/60 |
| JP | 58-64003 A | * | 10/1981 | H01F/5/04 |
| JP | 56-153954 A | * | 11/1981 | H02K/15/12 |
| JP | 57-126105 A | * | 8/1982 | H01F/5/06 |
| JP | 62-196052 A | * | 8/1987 | H02K/15/12 |
| JP | 2-39916 | | 2/1990 | |
| JP | 02-039916 | | 2/1990 | |

OTHER PUBLICATIONS

"SamicaShield Our Solution to problems with frequency converters"; copyright VanRoll/Sola—*see attachment A*.

EMA journal Mar. 1996, to "Herstellung der Wicklungen elektrischer Maschinen".—*see attachment A*.

EMA journal Mar. 1996, "Lexion Elektrotechnik"—*see attachment A*.

\* cited by examiner

*Primary Examiner*—William H. Mayo, III
(74) *Attorney, Agent, or Firm*—Leydig, Voit & Mayer, Ltd.

(57) ABSTRACT

Electrical conductors, such as bare or round wires, are insulated by taping with a micaceous insulating tape, having a film support of a polymer which can be heat-shrunk above 150° C. and a layer of mica fastened to the film support by means of a binder, and subsequent heat shrinkage of the polymer. The micaceous tape can also have a second film support of a polymer which can be heat shrunk above 150° C.; this second film support is then fastened to the mica layer on the side opposing the first film support.

20 Claims, 1 Drawing Sheet

INSULATION FOR ELECTRICAL CONDUCTORS THAT PRODUCES NO PARTIAL DISCHARGES

FIELD OF THE INVENTION

The invention relates to a method of insulating an electrical conductor for electrotechnical applications in such a way that no partial discharges are produced, and also to insulations and conductors obtainable as a result that produce no partial discharges for windings of electrical machines and transformers.

BACKGROUND OF THE INVENTION

Electrical machines of a high-voltage type of design are usually formed with windings from preformed coils with flat wires (also known as profile wires) (cf. Sequenz H.: "Herstellung der Wicklungen elektrischer Maschinen", Vienna, Springer-Verlag 1973, from page 107). An insulation that does not produce partial discharges for windings of such machines is described, for example, in DE-B 10 56 722, where the enameled profile wires were provided with a taping of micaceous insulating tapes and the windings were impregnated with impregnating agents by the vacuum impregnating process and cured. To allow insulated preformed coils of profile wires to be inserted into laminated cores, it is necessary however to arrange open slots in the laminated cores, which however has disadvantageous effects on the operating behaviour, or makes it necessary to close the slots laboriously with magnetic slot seals, to avoid these disadvantages. Moreover, the production of preformed windings with flat wires is labor-intensive and requires a high level of technological expenditure.

To avoid these disadvantages, it was proposed in DE-A-198 03 308 to arrange in half-open slots of the laminated core a slot lining of a micaceous sheet-like insulating material, to place in the slots a round-wire mush winding of a winding wire taped with film mica tape with one or more layers of overlap and to break down each coil respectively lying in two slots into at least two part-coils lying one over the other, arranged one behind the other and insulated from one another by intermediate layers. Half-open or half-closed slots are understood in this case as meaning slots with a slot slit of a width which is much smaller than the slot width, thereby dispensing with the effort of introducing magnetic slot seals.

It is known on the other hand that, with the use of pulsed voltage inverters for setting the speed, the problem of interturn or interphase shorts causing three-phase machines to fail, which had been regarded as solved, has occurred again in individual application situations. To avoid such failures, limit values of the winding loading were recommended (for example in the technical journal EMA, issue 3/96), although a reduction in the service life of the electrical machines has nevertheless to be expected or the installation of additional system components (for example filters) is necessary.

Therefore, EP-A1-0 822 640 proposed a low-voltage insulation that does not produce partial discharges for windings of electrical machines, in particular for frequency-converter-fed three-phase motors, which is characterized in that the winding comprises enameled wires known per se, in that these enameled wires are provided with a taping of micaceous insulating tapes, in that the slot is lined with sheet-like insulating materials of high heat resistance, in that the number of parallel wires and parallel branches is minimized and in that the windings are impregnated with impregnating agents by the power-UV process or the vacuum-impregnating process and cured. By minimizing parallel branches and/or conductors, it is intended to counteract the increase in the space requirement caused by the additionally introduced taping.

Today it is customary to operate low-voltage machines on frequency converters with high clock frequencies of up to 20,000 Hz. The problem lies with the occurrence of partial discharges between neighbouring conductors, caused by the steep voltage edges of the converter voltage. In the worst case, this has the effect of overvoltages, which may reach over twice the value of the voltage of the intermediate circuit. Since partial discharges may lead to the destruction of the enamel insulations of conventional winding wires, and thereby result in electrical breakdown, the use of enameled wires in converter-operated motors is problematical at supply voltages above 400 V.

BRIEF SUMMARY OF THE INVENTION

It has surprisingly been found that the insulation of electrical conductors can be considerably improved from various aspects if the conductor is taped with a mica tape which has a film support of a polymer which is heat-shrinkable above 150° C., and the polymer is subjected to heat shrinkage after the taping of the conductor.

DETAILED DESCRIPTION OF THE INVENTION

Figure 1A:
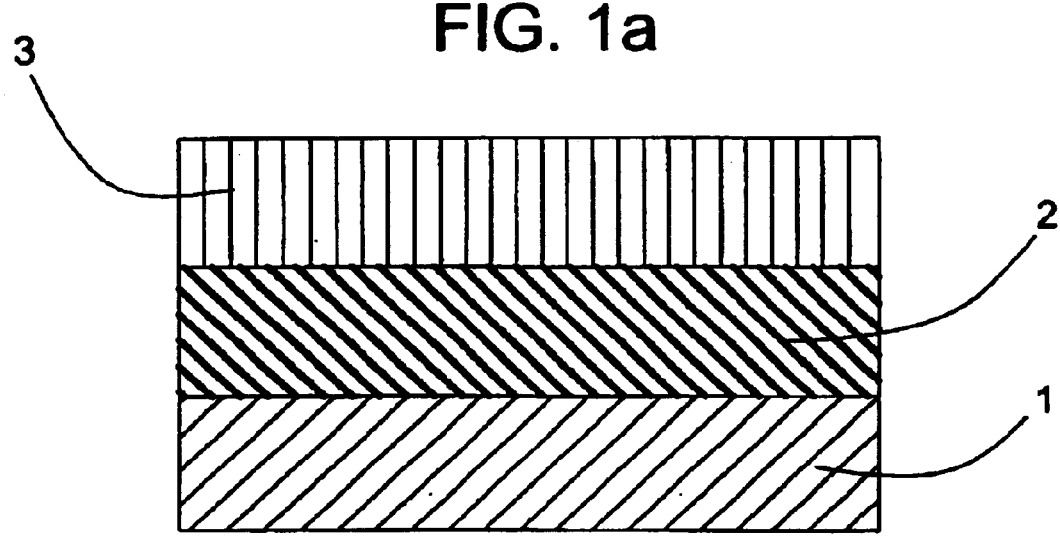
FIG. 1a shows a cross-sectional view of an electrical conductor 1 according to the invention provided with a taping of micaceous insulating tape, whereby the insulating tape consists of one heat-shrunk film support 3 of a polymer which can be heat-shrunk above 150° C. and of a layer of mica 2 fastened to the film support 3 by means of a binder, with a layer of mica 2 arranged on the conductor side.
Figure 1B:
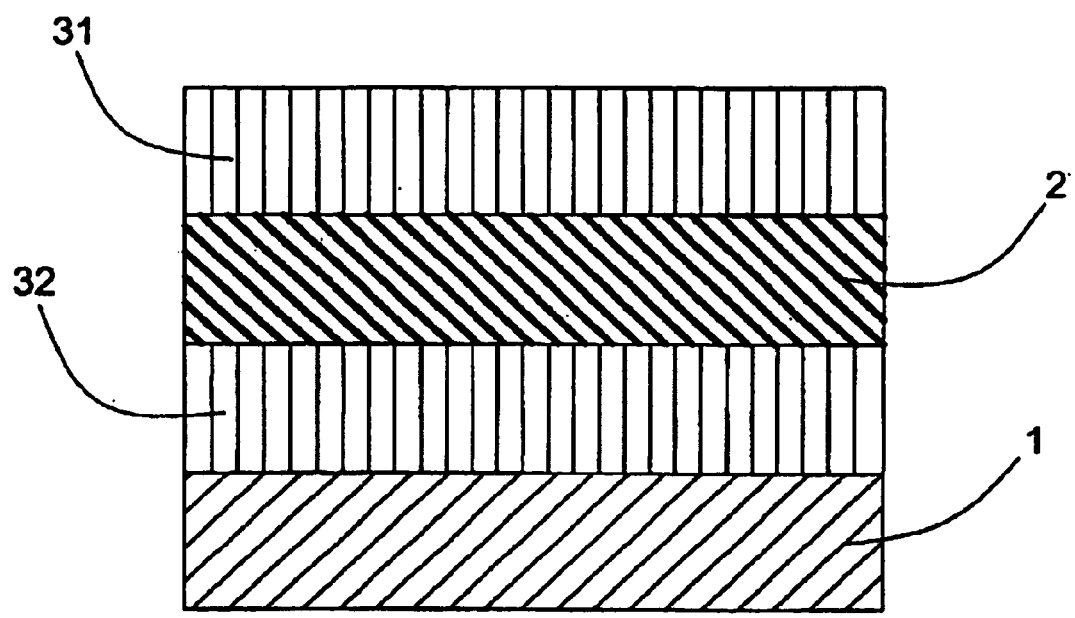
FIG. 1b shows a cross-sectional view of an electrical conductor 1 according to the invention provided with a taping of a micaceous insulating tape, whereby the insulating tape consists of a first heat-shrunk film support 31 of a polymer which can be heat-shrunk above 150° C., of a layer of mica 2 fastened to the first film support 31 by means of a binder and of a second, heat-shrunk film support 32 of a polymer which can be heat-shrunk above 150° C., arranged on the surface of the layer of mica 2 facing away from the first film support 31 and fastened to the layer of mica 2 by means of a binder.

The heat shrinkage on the one hand has the effect of considerably improving the adhesion of the insulation and the processability of the insulated conductor, making it possible to avoid unraveling of the insulation in particular also when bare wires are used, even without the use of adhesive. On the other hand, the shrinkage forces bring about a compression of the mica and, as a result, a desired reduction in the thickness of the insulation in comparison to a mere taping with mica tape. Furthermore, the adhesive bonding and shrinking has the consequence that a less fissured surface is obtained and, in particular, the risk of pockets and folds forming as a result of mechanical influences (for example bending of the conductors is considerably reduced. At the same time, the electrical properties, in particular the dielectric strength and corona resistance, and also the short-term and long-term breakdown voltage resistance, of the insulation are clearly improved. For example, it was found that, in comparison with conventional enameled wires, this method allowed the service life to be improved by a factor of approximately 2000 with approximately twice the partial-discharge inception voltage.

This method therefore makes it possible to produce novel pore-free and, if desired, very thin mica insulations with improved electrical properties which are suitable in particular for use in electrical low-voltage machines and/or the use of bare wires but also offer surprising advantages in the case of other electrotechnical applications, such as for example in electrical machines of high-voltage type or in transformers. As a result of the possible reduction in the thickness of the insulation, moreover, it is possible to dispense entirely or largely with the minimization of the number of parallel wires and parallel branches recommended in EP-A1-0 822 640. If a particularly high heat resistance of the insulation is desired, this can be achieved, for example, by using a film support of highly temperature-resistant materials, for example polyimide.

The invention therefore relates to a method of insulating an electrical conductor for electrotechnical applications in such a way that no partial discharges are produced by taping with a micaceous insulating tape, which method is characterized in that a micaceous insulating tape comprising a film support of a polymer which can be heat-shrunk above 150° C. and a layer of mica fastened to the film support by means of a binder is used for taping the conductor, and the taped conductor is subjected to a heat treatment at a temperature above 150° C. for the purpose of heat-shrinking the polymer.

The method according to the invention is suitable—as mentioned—in particular for insulating windings of electrical machines of high- or low-voltage type and of transformers. According to a generally valid definition of voltage levels used today among those skilled in the art ("Lexikon Elektrotechnik", VCH Verlags-gesellschaft mbH, Weinheim, N.Y., 1994, p. 625), within the context of the present invention high voltage refers to a voltage of >1000 V, while voltage levels of ≦1000 V are understood by low voltage.

The invention therefore likewise relates to an insulation that produces no partial discharges for windings of electrical machines and transformers and also to an electrical conductor that produces no partial discharges, the insulation and the conductor being characterized in that the winding comprises electrical conductors known per se, in that these conductors are provided with a taping of micaceous insulating tape and in that this insulating tape comprises a heat-shrunk film support of a polymer which can be heat-shrunk above 150° C. and a layer of mica fastened to the film support by means of a binder.

According to the invention, in principle all conductors commonly used in electrotechnical applications, for example round or flat wires of enameled- or bare-wire type, which may comprise customary conductor materials such as copper, nickel-plated or tin-plated copper, aluminum, nickel, superconductors and the like and have customary diameters or cross sections, are suitable as electrical conductors. The electrical conductor may preferably be a round wire, typically a round wire with a diameter of approximately 0.6 to 4 mm, and/or a bare wire.

Micaceous insulating tapes, comprising a film support of a polymer which can be heat-shrunk above 150° C. and a layer of mica fastened to the film support by means of a binder, are likewise known in principle to a person skilled in the art and can be produced in a known way or a way known per se, it being possible to use customary layers of mica (for example mica paper) and customary binders (for example epoxy resins or silicone resins). Suitable film supports of a polymer which can be heat-shrunk above 150° C., for example a polyester, poly(ethylene terephthalate), poly (ethylene-2,6-naphthalene dicarboxylate), polyimide or polycarbonate, have likewise already occasionally been used in the prior art, but not subjected there to the heat shrinkage according to the invention. According to the invention, very thin insulating tapes can also be used, tape thicknesses typically being approximately 0.06 to 0.09 mm.

If desired, the layer of mica of the insulating tape may be fastened on both sides to a film support by means of a binder, it preferably being possible for both film supports to consist of a polymer which can be heat-shrunk above 150° C., i.e. the insulating tape may have on the surface of the layer of mica facing away from the first film support a second film support, preferably likewise of a polymer which can be heat-shrunk above 150° C. This embodiment may be of advantage, for example, when using bare wires and/or if the insulating tape is to be coated with adhesive on both sides.

If desired, the insulating tape may be coated on one or both sides with adhesive, preferably a thermosetting hot-melt adhesive, in order to further improve the adhesion of the tape on the conductor. The adhesive is preferably applied to the film support or the film supports. In addition or instead of coating the insulating tape with adhesive, if desired the electrical conductor may also be coated with adhesive or a polymerizable enamel, or a bakable enameled wire may be used.

In principle, all customary taping methods, such as radial taping, tangential taping, steep-angle taping, longitudinal taping, etc. with all possible overlaps (typically approximately 20%–66% overlap) or butted, are suitable for taping the electrical conductor with the micaceous insulating tape. The conductor may be processed by means of a manual or automatic drawing-in technique. Taping with insulating tapes which have only one film support is preferably performed in such a way that the mica surface comes to lie on the conductor, i.e. is arranged on the conductor side (inside).

Once the taping of the conductor has taken place, the latter is subjected to a heat treatment at a temperature above 150° C., preferably approximately 200 to 250° C., for the purpose of heat-shrinking the polymer. This may preferably be performed by the conductor being passed through a furnace (for example an induction furnace) after the taping and heated for a short time (for example during approximately 2 minutes) to the desired temperature as it passes through. Long-lasting heat treatments, on the other hand, should be avoided, in particular when using film supports of polymers that do not have adequate heat stability and could therefore be destroyed. The heat shrinkage generally leads to a significant reduction in the tape thickness; for example, tests with insulating tapes of a thickness of 0.06 mm produced after the heat shrinkage a tape thickness of 0.045 mm. The increases in insulation obtained by the taping and heat treatment according to the invention are dependent on the insulating tape used, but may typically be approximately 0.16 to 0.50 mm.

If desired, the insulated conductor may be lubricated in a way known per se with lubricants, such as paraffins or waxes, to improve the processability and the sliding properties. Alternatively, if desired, an overcoating may be performed, for example with saturated alkyd resins or polymerizable enamels or resins.

The insulated wire may subsequently be wound to coils in a way known per se. Further measures such as slot insulation, impregnation of the coil, etc. can, where necessary, likewise be carried out in a way known per se.

The invention is further illustrated by the following example:

EXAMPLE

A bare copper wire with a diameter of 1.20 mm is introduced into a taping machine according to the prior art. At a taping head, a mica tape, which has a thickness of 0.06 mm and a tape width of 6 mm and which comprises a 0.025 mm thick polyester film which can be heat-shrunk above 150° C. and a 0.035 mm thick mica paper attached to the polyester film by means of epoxy resin and has on the polyester film, on the side facing away from the mica paper, a coating of hot-melt adhesive, is applied to the copper wire in such a way that the mica side lies on the copper. The mica tape is radially taped with a tensile stress of 7 N and with an overlap of 25% in such a way that it lies flush and without any folds. Subsequently, the wire is heat-treated in a continuous furnace at 220° C. for 1.5 minutes as it passes through. The heat treatment brings about a shrinkage of the film and an adhesive bonding of the tape at the overlap points. After the heat treatment, the wire has an increase in insulation of approximately 0.16–0.19 mm and is lubricated in a way known per se with paraffin and wound onto delivery spools. The electrical breakdown voltage in a ball tank on a test piece comprising a coil around a mandrel diameter corresponding to 10 times the wire diameter must be greater than 1500 V and is on average 2500 V. For the partial-discharge inception voltage, a value of 1100 V is obtained.

What is claimed is:

1. An insulated electrical conductor that does not produce partial discharges for windings of electrical machines and transformers,
   wherein an electrical conductor is provided with a taping of micaceous insulating tape consisting of a heat-shrunk film support of a polymer which can be heat-shrunk above 150° C. and of a layer of mica fastened to the film support by means of a binder, and wherein said insulated conductor is wound to a coil.

2. An insulated electrical conductor that does not produce partial discharges for windings of electrical machines and transformers,
   wherein an electrical conductor is provided with a taping of micaceous insulating tape which consists of a heat-shrunk film support of a polymer which can be heat-shrunk above 150° C., of a layer of mica fastened to the film support by means of a binder and of a second heat-shrunk film support of a polymer which can be heat-shrunk above 150° C., arranged on the surface of the layer of mica by means of a binder, and wherein the insulated conductor is wound to a coil.

3. An insulation of electrical conductors that does not produce partial discharges for winding of electrical machines and transformers,
   wherein a taping of micaceous insulating tape, consisting of a heat-shrunk film support of a polymer which can be heat-shrunk above 150° C. and of a layer of mica fastened to the film support by means of a binder, adheres onto an electrical conductor to form an insulated conductor, and wherein said insulated conductor is wound to a coil.

4. An insulation that does not produce partial discharges for windings of electrical machines and transformers,
   wherein a taping of micaceous insulating tape, consisting of a heat-shrunk film support of a polymer which can be heat-shrunk above 150° C., of a layer of mica fastened to the film support by means of a binder and of a second heat-shrunk film support of a polymer which can be heat-shrunk above 150° C., arranged on the surface of the layer of mica facing away from the first film support, and fastened to the layer of mica by means of a binder; adheres onto an electrical conductor to form an insulated conductor, and wherein said insulated conductor is wound to a coil.

5. A method of insulating an electrical conductor for windings of electrical machines and transformers in such a way that no partial discharges are produced by taping with a micaceous insulating tape, which method comprising providing said conductor with an insulating tape consisting of a film support of a polymer which can be heat-shrunk above 150° C., of a layer of mica fastened to the film support by means of a binder and of a second film support of a polymer which can be heat-shrunk above 150° C. arranged, on the surface of the layer of mica facing away from the first film support, and fastened to the layer of mica by means of a binder; by taping said conductor with said insulating tape; and subjecting the resulting taped conductor to a heat treatment at a temperature above 150° C. for the purpose of heat-shrinking the polymer.

6. A method of insulating an electrical conductor for windings of electrical machines and transformers in such a way that no partial discharges are produced by taping with a micaceous insulating tape, which method comprising providing an insulating tape consisting of a film support of a polymer which can be heat-shrunk above 150° C. and of a layer of mica fastened to the film support by means of a binder; by taping said conductor with said insulating tape; and subjecting the resulting taped conductor to a heat treatment at a temperature above 150° C. for the purpose of heat-shrinking the polymer.

7. The method as claimed in claim 1, wherein the electrical conductor is a round wire.

8. The method as claimed in claim 7, wherein the electrical conductor is a bare wire.

9. The method as claimed in claim 7, wherein the heat-shrinkable polymer is a polyester, poly (ethyleneterephthalate), poly-(ethylene-2,6-naphthalenedicarboxylate), polyimide or polycarbonate.

10. The method as claimed in claim 7, wherein the insulating tape is coated on one or both sides with adhesive.

11. The method as claimed in claim 7, wherein the insulating tape has a tape thickness of 0.06–0.09 mm.

12. The method as claimed in claim 7, wherein the increase in insulation brought about by the insulating tape after the heat treatment is 0.16 to 0.50 mm.

13. The method as claimed in claim 1, wherein the electrical conductor is a bare wire.

14. The method as claimed in claim 13, wherein the heat-shrinkable polymer is a polyester, poly (ethyleneterephthalate), poly-(ethylene-2,6-naphthalenedicarboxylate), polyimide or polycarbonate.

15. The method as claimed in claim 13, wherein the insulating tape is coated on one or both sides with adhesive.

16. The method as claimed in claim 13, wherein the insulating tape has a tape thickness of 0.06–0.09 mm.

17. The method as claimed in claim 1, wherein the heat-shrinkable polymer is a polyester, poly (ethyleneterephthalate), poly-(ethylene-2, 6-naphthalenedicarboxylate), polyimide or polycarbonate.

18. The method as claimed in claim 1, wherein the insulating tape is coated on one or both sides with adhesive.

19. The method as claimed in claim 1, wherein the insulating tape has a tape thickness of 0.06–0.09 mm.

20. The method as claimed in claim 1, wherein the increase in insulation brought about by the insulating tape after the heat treatment is 0.16 to 0.50 mm.

* * * * *